United States Patent [19]
Kableshkov

[11] Patent Number: 5,857,183
[45] Date of Patent: Jan. 5, 1999

[54] PROCESSOR FOR SEQUENTIAL DATA RETRIEVAL FROM A RELATIONAL DATABASE

[75] Inventor: Stoian Kableshkov, Ayr, Scotland

[73] Assignee: Digital Equipment Corporation, Maynard, Mass.

[21] Appl. No.: 850,530

[22] Filed: May 2, 1997

Related U.S. Application Data

[63] Continuation of Ser. No. 639,314, Apr. 24, 1996, abandoned, and Ser. No. 177,362, Jan. 4, 1994, abandoned.

[30] Foreign Application Priority Data

Jan. 9, 1993 [GB] United Kingdom ............... 9300329

[51] Int. Cl.⁶ .................................................. G06F 17/30
[52] U.S. Cl. ............................. 707/3; 707/102; 395/284; 395/287; 395/800.33
[58] Field of Search ................................. 395/825, 200.08, 395/200.03, 840, 289, 287, 284, 800.33; 707/3, 102

[56] References Cited

U.S. PATENT DOCUMENTS

| | | | |
|---|---|---|---|
| 4,876,643 | 10/1989 | McNeill et al. | 364/200 |
| 5,226,165 | 7/1993 | Martin | 395/600 |
| 5,247,665 | 9/1993 | Matsuda | 395/600 |
| 5,249,262 | 9/1993 | Baule | 395/66 |
| 5,257,367 | 10/1993 | Goodlander et al. | 395/600 |
| 5,353,401 | 10/1994 | Iizawa et al. | 395/161 |
| 5,408,655 | 4/1995 | Oren et al. | 395/600 |

*Primary Examiner*—Thomas G. Black
*Assistant Examiner*—Jean R. Homere
*Attorney, Agent, or Firm*—David Suhl

[57] ABSTRACT

A database co-processor for efficient sequential data retrieval from a relational database is provided which is adapted for connection to a host system via a two-way bus. The database co-processor includes an interface unit connected to receive and transmit data over the two-way bus and a database engine connected to the interface unit by input and output bus means. The database engine includes a relevant field selection unit for storing selection criteria relevant to a database query raised by the processor. A comparator which is incorporated into the database engine compares input candidate data received on the input bus in accordance with the selection criteria and produces a result. The database engine further includes a storage medium for the storage of output candidate data received on the input bus. Additionally, the database engine includes a processor for transmitting on the output bus at least a part of (for example, pointers to) the output candidate data in response to the result from the comparison means. The co-processor is designed to enable the circuitry to be manufactured as a single application-specific integrated circuit device.

5 Claims, 13 Drawing Sheets

| | RELATION : STOCK | | | ATTRIBUTE | | |
|---|---|---|---|---|---|---|
| COLUMN | 1 | 2 | 3 | 4 | 5 | |
| | STOCK CODE | DESCR. | UNIT PR. | NO. STOCK | SUPPLIER | |
| ROW 1 | 1257 | AAA | 4.75 | 14 | A | } non-qualifying row |
| 2 | 3681 | BBB | 3.90 | 28 | D | |
| 3 | 4237 | CCC | 0.50 | 10 | B | — FIELD |
| 4 | 4238 | DDD | 1.19 | 7 | B | |
| 5 | 4239 | EEE | 0.25 | 10 | B | |
| 6 | 5716 | FFF | 8.20 | 40 | A | } non-qualifying row |
| 7 | 6147 | GGG | 7.75 | 3 | C | | input candidate / output candidates

Figure 12

RELATION : STOCK

| COLUMN | 1 | 2 | 3 | 4 | 5 | |
|---|---|---|---|---|---|---|
| | STOCK CODE | DESCR. | UNIT PR. | NO. STOCK | SUPPLIER | |
| | | | | ATTRIBUTE | | |
| | | | | NO. STOCK | SUPPLIER | FIELD |
| ROW 1 | 1257 | AAA | 4.75 | 14 | A | |
| 2 | 3681 | BBB | 3.90 | 28 | D | } non-qualifying row |
| 3 | 4237 | CCC | 0.50 | 10 | B | |
| 4 | 4238 | DDD | 1.19 | 7 | B | |
| 5 | 4239 | EEE | 0.25 | 10 | B | |
| 6 | 5716 | FFF | 8.20 | 40 | A | } non-qualifying row |
| 7 | 6147 | GGG | 7.75 | 3 | C | | input candidate | output candidates

PROCESSOR FOR SEQUENTIAL DATA RETRIEVAL FROM A RELATIONAL DATABASE

This application is a continuation of application Ser. No. 08/177,362, filed Jan. 4, 1994, now abandoned.

This application is a continuation, of application Ser. No. 08/639,314, filed Apr. 24, 1996, now abandoned.

FIELD OF THE INVENTION

The present invention relates to a class of autonomous devices which dynamically process input data-streams and produce real-time output therefrom. In particular, the invention relates to processors suitable for manipulating and filtering data produced, for example, by serial retrieval from a relational database in response to a database query.

The mode of operation of such a processor in a relational database environment is characterized by a steady stream of input data which is operated upon to produce a response stream, or output, in real time. The input stream follows a predictable pattern or rhythmic cycle. For example, in handling a relational database query, a relational table consisting of individual data fields in rows and columns may be read from a disk or other memory device in a predefined format and sequence (ie., row by row, each row consisting of individual fields) which follows a pattern governed by the format of the table.

Large, regular data sets such as the tables identified above, are filtered by testing for inclusion of the individual data items into particular domains, or for their adherence to certain criteria. Many of these filtering activities are regular and cumulative, for example summing or averaging data sets which comply with the testing conditions above.

Classical general-purpose CPU's are inherently unsuitable for such applications where the main activity is in the transfer of data. They under-use their operational hardware, but achieve a relatively slow response time since they are single thread control-flow processors which cannot easily follow the pace of the data-stream. Use of large buffering facility, or multiple parallel processing is thus necessary. This incurs further expense, and it is difficult to coordinate the multiple devices.

Cached CPU's (eg. RISC based) are further disadvantaged in the database processing environment as there is a low degree of re-use of the data, with cache hit rates consequently very low. Additionally, sequentially retrieved data tends to flush caches and thereby reduces overall system performance.

The problems outlined above have been addressed by data-indexing (where table entries are indexed in the sequence of intended access, to facilitate better-targeted data extraction from the table) which is viable chiefly for large database tables. Typically, this allows a table to be sequenced in a number of ways according to the data values in different columns. Improved performance is achieved at the expense of substantially increased memory requirement for storing many index files. Hence, indexing is far from suitable for memory-constrained systems such as personal computers.

Specialized relational database processing engines have been designed, but their main negative feature is the complexity of the operational hardware and large buffer sizes. Many such processors normally work by accessing parallel disk arrays simultaneously and need special data formatting requirements and layout. This inherently renders them bulky, expensive and environment-particular, hence unsuitable for the mass-user who requires a small system, standard off-the-shelf parts and attendance by non-professional staff.

SUMMARY OF THE INVENTION

It is an object of the present invention to provide a method and device (co-processor) for the real time processing of cyclic data streams so as to minimize the use of host CPU time and/or memory.

It is a further object of the present invention to achieve said co-processor in an efficient and compact device which may fitted into a single application specific integrated circuit.

It is a further object of the present invention to provide a compact and inexpensive device for efficient sequential data retrieval from a relational database, for both formatted and textual data.

The benefits of the present invention are provided by the buffering of only potential output candidate data (or pointers thereto) presented in an input datastream concurrently with the processing of input selection criteria applied to the input datastream in order to facilitate consequent output of qualified output candidate data, all input and output candidate data being provided within the single input datastream.

The co-processor is also preferably configured to operate on an input datastream in quasi-realtime, processing the input datastream and thereby producing an output datastream concurrently therewith.

The co-processor offers further advantages in its ability to operate autonomously from a host processor. The host processor formulates a query program which can be retrieved by the co-processor, which then loads the appropriate selection criteria into the relevant logic circuits, manages the serial retrieval of appropriate data, and directs the results to an instructed location.

In accordance with one embodiment of the present invention there is provided a database processor for connection to a host processor via first bus means, the database processor comprising interface means connected to receive and transmit data over the first bus means and a database engine connected to said interface means by internal bus means.

The database engine includes means for storing selection criteria relevant to a database query raised by the processor, comparison means for comparing input candidate data received on the internal bus means in accordance with the selection criteria and producing a result therefrom, storage means for the storage of output candidate data received on the internal bus means and means for transmitting on said internal bus means at least a part of the output candidate data in response to the result from the comparison means.

BRIEF DESCRIPTION OF THE DRAWING

Embodiments of the present invention will now be described in detail by way of example, and with reference to the accompanying drawings in which:

FIG. 12 shows a table representation of a relational database.

DESCRIPTION OF PREFERRED EMBODIMENTS

Figure 1:
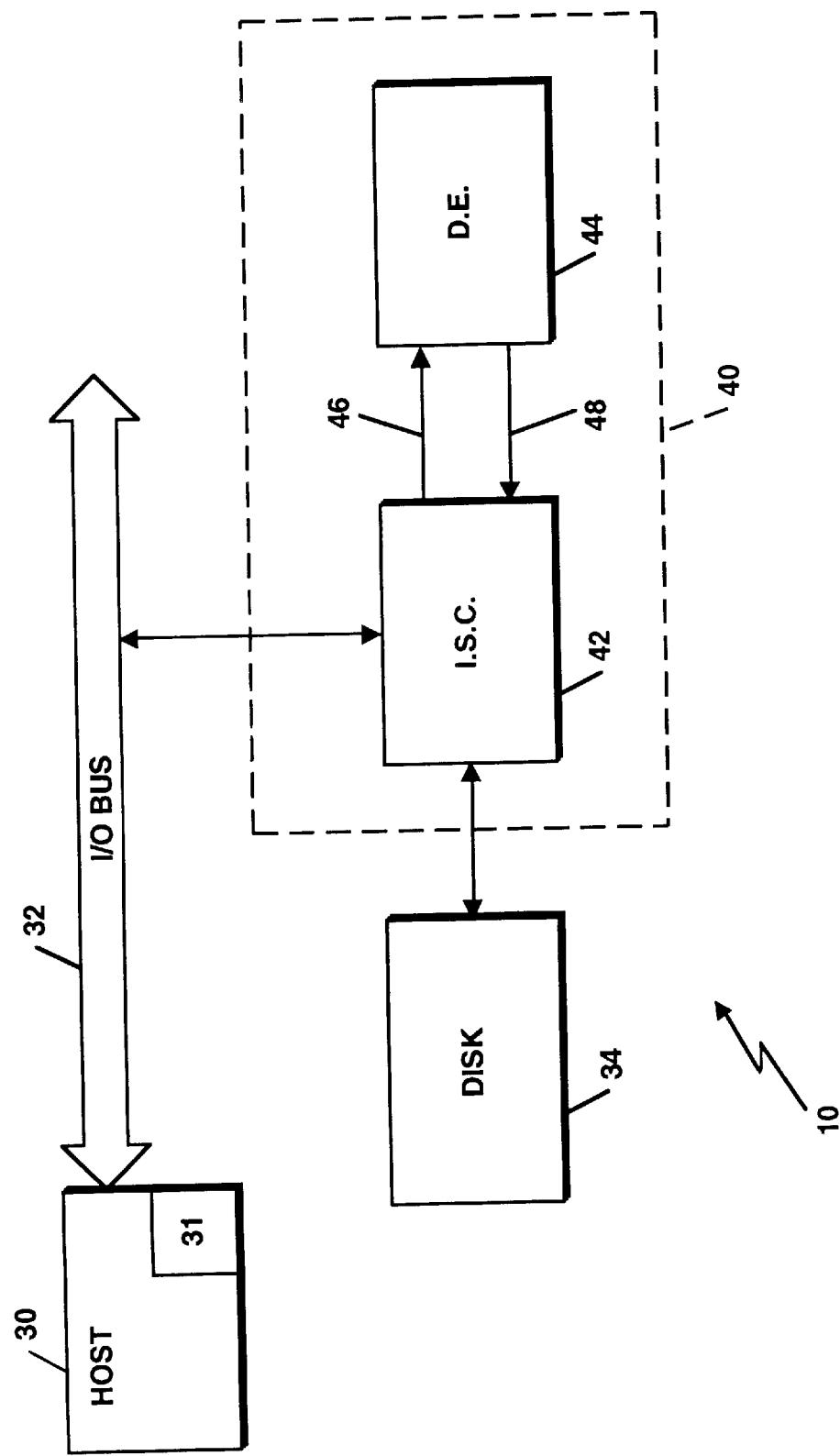
FIG. 1 shows a schematic block diagram of a system incorporating a relational database co-processor according to one embodiment of the present invention.

Although the principles of the present invention may be applied widely to the processing of cyclic data-streams, it is advantageous to describe the invention in the context of, for example, a relational database processor. In order to be able to better visualize the present invention, a very simple database example is provided with which to relate the description of the individual components and their functions.

The relational database has emerged as a widely used method of providing a data model of a particular organizational structure. According to the present example, in the relational database information relating to an entity, for example, the stock in a warehouse may be characterized by a number of attributes, eg. stock item code number, a description of the stock item, a unit price, the number currently in stock, and the identification of a supplier. Each of these attributes may be visualized as the column header of a table (see FIG. 12), and individual data entries for each attribute referred to hereinafter as a data field occur in each column of each row. Each row represents an occurrence of that entity, ie. a particular type of stock item and the values of its related attributes. In this simple example, the reading of the data table from, for example, a disk or memory may be regarded as an input data-stream having a periodicity. This periodicity is embodied in the repeating data-fields which go to make up an entire row: each row follows the same data format of a number of data fields in a predetermined sequence: "stock code", "description", "unit price" etc although within each cycle, different data values from the data field are presented.

A typical database processor allows a user of the database to request information from that database according to certain criteria. Such a request is normally termed a query. A query may require access to several different tables in order to provide the necessary response, and methods for compounding queries and linking the tables are well known. In this example, we shall be limited to a single table.

A typical query may, for example, require that the description of all stock items with part numbers 4000 to 4999 be provided as output, together with a total value of all this stock.

In the present example, this requires the examination of each row of the table to determine whether attribute "stock code" lies within the range 4000 to 4999. If it does not, the row is of no interest and it may be termed "non-qualifying". With reference to table 1, it can be observed that rows 1, 2, 6 and 7 are non-qualifying rows. Where "stock code" does lie within the range 4000 to 4999, the row is then termed a "qualifying" row. With reference to table 1, rows 3 to 5 are qualifying rows. For each qualifying row, the values of the attributes "description", "unit price" and "number" must be processed—"description" destined for output, and "unit price", "number" destined for multiplication and then addition to a cumulative store. We shall define these as qualifying fields. A row may thus be described as having:

a) input candidate field(s) (eg. "stock code") selected from the total number of fields which must be tested in order to determine qualification of the row;

b) output candidate fields (eg. "description", "unit price" and "number") which might be required as output if the row qualifies; and c) qualified and non-qualified output fields as determined by the result of the tests applied to the input candidate fields. Fields which are either input candidates, output candidates or both may be termed relevant fields. It is possible that some queries may require the whole row to be output in the event that the input candidate fields qualify: in this case the whole row is an output candidate.

A further feature of relational databases is that the database tables may be fragmented, with portions thereof distributed about various memory devices. Thus, the data-stream to be provided to the database co-processor may be sourced from a number of locations, possibly on a block-by-block basis.

System Architecture

Figure 2:
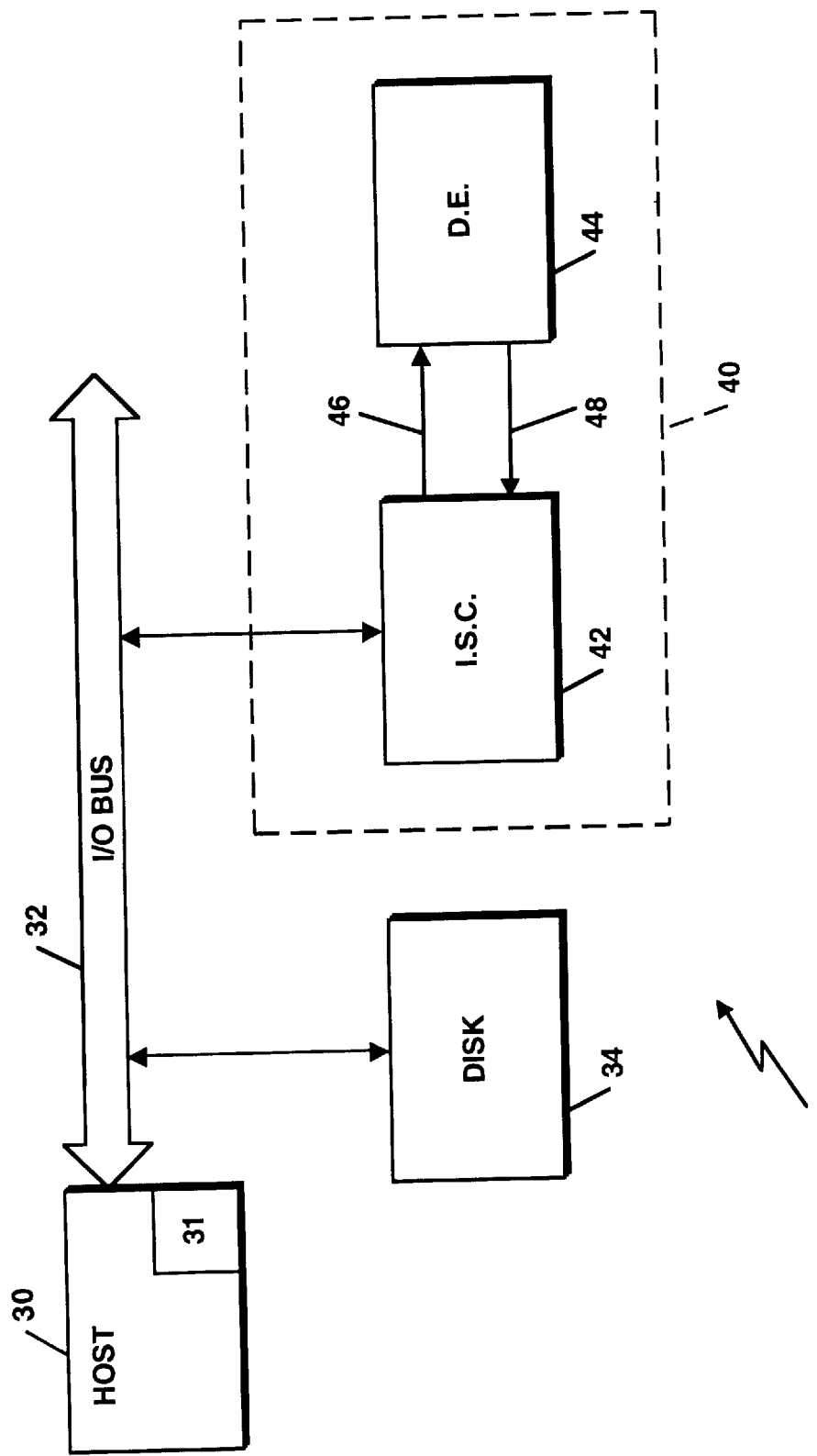
FIG. 2 shows a schematic block diagram of a system incorporating a relational database co-processor according to a further embodiment of the present invention further elaborated herein.

With reference to FIGS. 1 and 2, there are shown two exemplary configurations of a system 10 incorporating a relational database co-processor 40 according to the present invention. The co-processor 40 includes an interface and stream control unit 42, and a database engine 44. The co-processor 40 is coupled to a host processor 30 via an input/output bus 32. The system 10 also includes a disk 34 upon which a relational database is resident.

In the configuration of FIG. 1, the co-processor 40 may communicate directly with disk 34, in which case the database engine 44 may operate upon a continuous input data-stream from the disk. This particular configuration is advantageous where bus resource is limited and the host has limited memory capacity.

However, present trends toward high bus bandwidths and larger host memory sizes result in the presently preferred configuration of FIG. 2. Here the disk 34 is connected to the input/output bus 32, and the database engine 44 may operate upon data retrieved from the disk over the bus, or preferably direct from a copy of the database or part thereof residing in a main memory 31 of the host processor 30. The co-processor 40 may alternatively be coupled to the host via the host's memory bus. In the presently preferred embodiment of the present invention, the database table would be loaded into the host main memory 31, and would be accessed by the co-processor on a page by page basis.

In this presently preferred system, the database query is sent from the processor 30, via interface and stream control unit (ISC) 42 to database engine 44, in the form of a work packet, or program, which we shall term the "activator". This may, in fact, include several compounded database queries which operate on the same database table. The interface and stream control unit (ISC) 42 is coupled to the database engine 44 by an input bus 46 and an output bus 48. In response to the query activator, the ISC 42 is directed to request the appropriate table data to be retrieved from memory 31 (or from disk 34). The data-stream is passed directly to database engine 44 which processes the query in real time, passing only qualified data back to the host via ISC 42. Results may be produced in real time on a row by row basis (in the example of table 1, each "description" field of each qualifying row of the table may be output as soon as the row has qualified) or the results may be cumulative (in the example of table 1, the total of the "unit price"/"number" multiples cannot be determined until the entire table has been read). The cumulative results will be passed to the host at the end of the table data-stream.

Interface and stream control unit 42 thus controls the input and output data-streams to and from the database engine 44, which necessarily alternate since both streams use the same host bus 32. Database engine 44 does the actual table scanning, data qualification and output selection under the control of the downloaded query activator.

Interface and stream control unit 42 and database engine 44 will now be described in greater detail with reference to FIGS. 3 and 4.

Interface and Stream Control Unit 42

Figure 3:
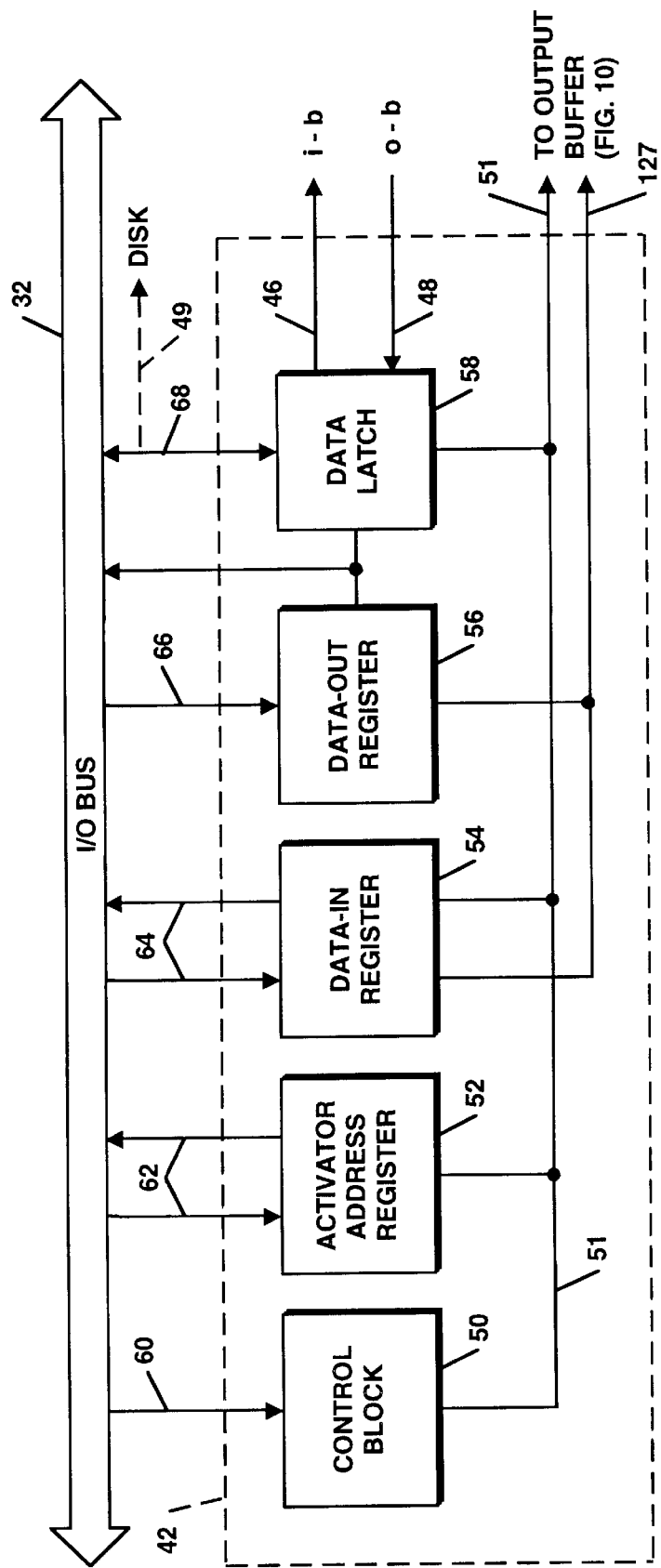
FIG. 3 shows a detailed block diagram of an interface and stream control unit of the database co-processor of FIG. 2.

With reference to FIG. 3 there is shown an exemplary embodiment of the interface and stream control unit (ISC) 42. The ISC is connected to the database engine 44 (FIG. 2) via input bus 46 and output bus 48, together with additional control lines 51 which will be described later. The ISC 42 comprises a control block 50, activator address register 52, data-in register 54, data-out register 56 and data latch 58.

The data latch 58 is coupled to the i/o bus 32 by bidirectional connection 68, for the two-way data traffic between the host memory 31 and the database engine 44. Data latch 58 enables the input table data-stream to pass to the database engine 44 from host memory 31 over bus 32 via bus connection 68 (or possibly from disk 34 by direct link 49).

The activator address register 52 receives the address of an activator (query program) to be executed from the host processor 30 over bus 32 and data line 62. This is used to read the current activator from the host's main memory 31 (or elsewhere) into the database engine 44.

Data-in register 54 and data-out register 56 are provided to respectively store main memory addresses for the table or data block to be processed, received over the bus 32 and data lines 64, 66 respectively, and to provide pointers to main memory 31 or elsewhere for storage of the results. For example, the data in register 54 will be supplied with, and store, the starting address of the table to be extracted. Data out register 56 will be supplied with, and store, the starting address of a location to which to direct the results. Each register 52, 54 preferably consists of a pair of registers so as to enable indirect addressing for large or fragmented tables which may be stored as separate pages in memory. In this case, one of the register pairs maintains the actual address presently being accessed; the other points to a current block of a list of addresses to be accessed in sequence, and is used (and then incremented) to fetch the next memory block address when one block is exhausted. If another block is not available, then the ISC may interrogate the host 30 for the information sought.

Control block 50 oversees and controls the functions of the ISC via control lines 51.

Database Engine 44

Figure 4:
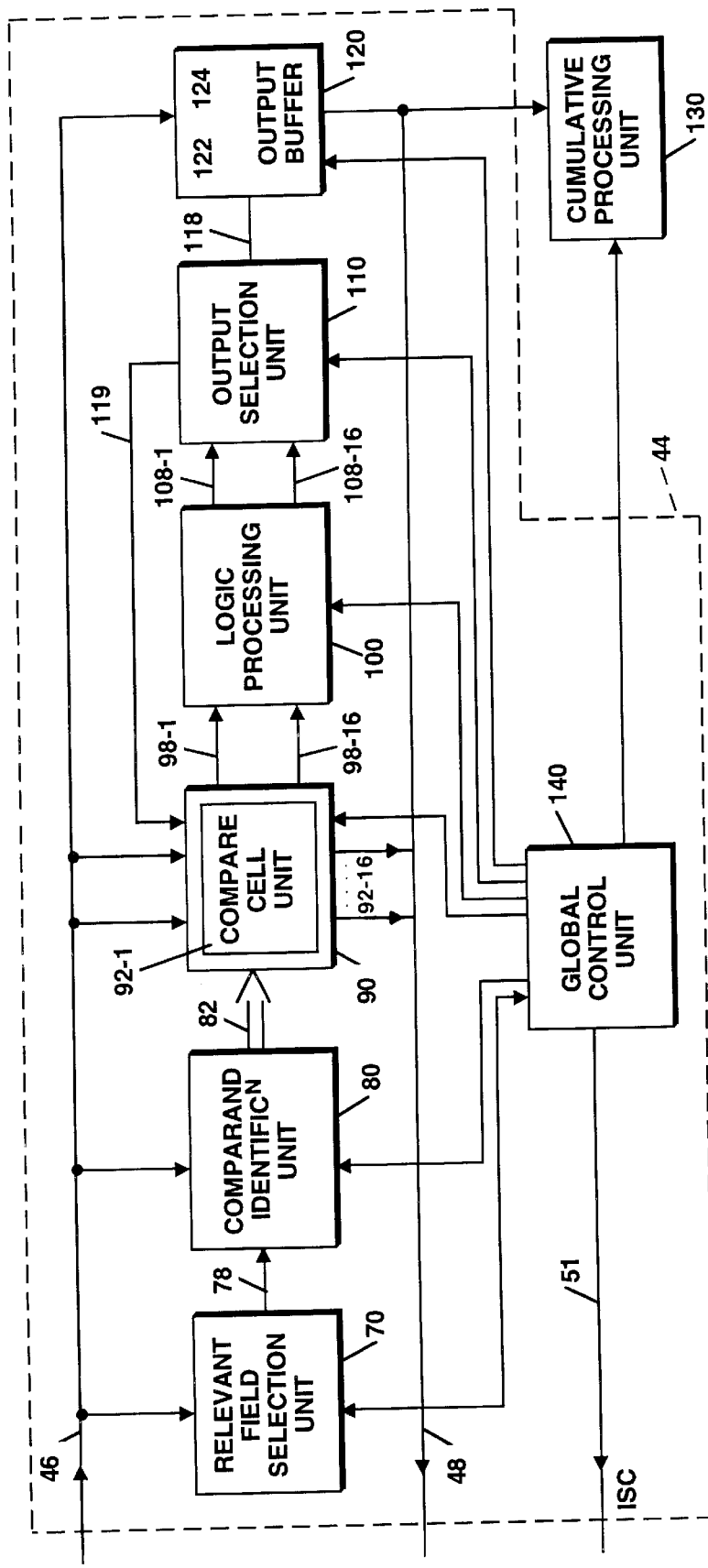
FIG. 4 shows a detailed block diagram of a database engine of the database co-processor of FIGS. 1 and 2.

With reference to FIG. 4 there is shown an exemplary embodiment of database engine 44, comprising six stages or functional blocks: a relevant field selection unit 70, a comparand identification unit 80, a compare cells block 90, a logic processor 100, an output selection unit 110, an output buffer 120, and a global control unit 140. The database engine may include a cumulative processing unit 130 as an integral part thereof, or this may be provided separately.

It is emphasised that the description which follows relates to an exemplary embodiment of the present invention, and that the buffer sizes, register sizes, bus widths and general configuration of the system relating to restrictions upon processing capability are not limiting to the present invention, but relate to a system in which cost and complexity of design have been compromised with commercial considerations.

Relevant Field Selection Unit 70

Relevant field selection unit 70 receives from ISC 42 details (as provided by the activator) of the table format and thereby identifies the fields of the data-stream arriving on input bus 46. It selects the fields which are relevant to the query input or output, ie. candidate input and output fields. Thus, referring to the example of table 1, relevant field selection unit 70 holds and periodically identifies the field descriptions "stock code", "description", "unit price" etc, to coincide with the appearance of the data pertaining to those fields on input bus 46. Also specified are the characteristics of the field data:

a) relevance to the query: input candidate, output candidate, both or irrelevant;

b) data type: character string, integer, floating point, etc;

c) data size: number of bytes in the field, unless the field is explicitly terminated by an end-of-field character, eg. null character or carriage return.

Figure 5:
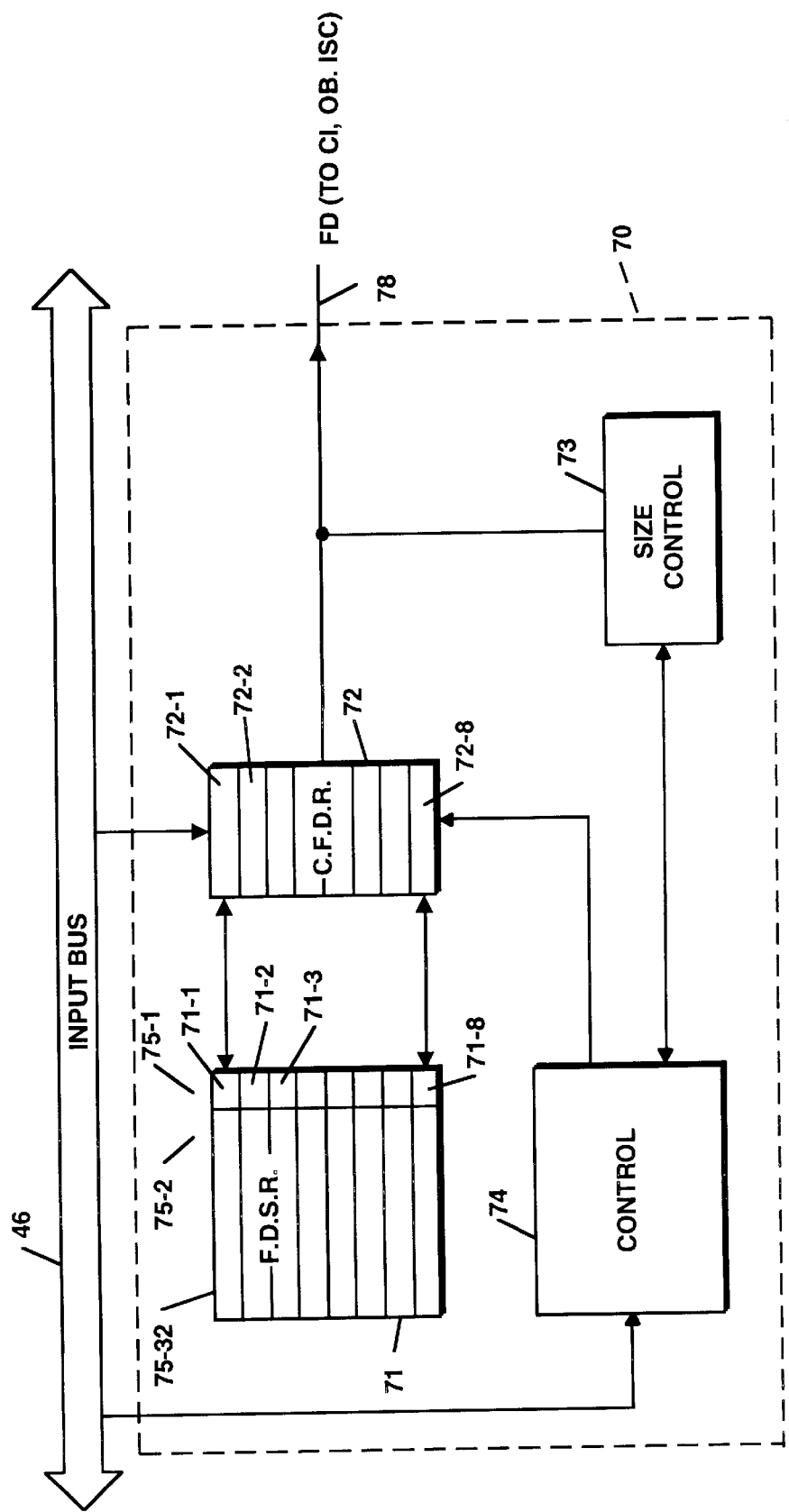
FIG. 5 shows a detailed block diagram of a relevant field selection unit of the database engine of FIG. 4.

With reference to FIG. 5, the relevant field selection unit 70 comprises:

a 32-byte field descriptions storage register 71 (FDSR) to receive from the ISC 42 and store all (up to 32) of the field descriptions;

a 1-byte current field description register 72 which is connected to the storage register 71, and which provides, over line 78, to other units in the database engine 44 the field description information from the field-descriptions storage register 71 pertaining, in real time, to the field actually present on the input bus 46;

a size counter 73 to count down each byte arriving on input bus 46, thereby controlling the update of the current field description register 72; and a control block 74.

The field descriptions are initially downloaded before the input data-stream is processed into the field descriptions storage register 71 from the input bus 46. As each field description of eight bits appears on the input bus 46, it is captured by current field description register 72 (72-1 . . . 72-8), and copied into field descriptions storage register 71 (71-1 . . . 71-8). One bit 72-1 is used to indicate relevance of the field as input, one bit 72-2 to indicate relevance of the field as output, one bit 72-3 to indicate numeric or non-numeric field type, and five bits 72-4 . . . 72-8 to indicate field length. In this embodiment, the co-processor can handle database queries including 32 fields.

Although the field descriptions storage register 71 is, in the present embodiment, only capable of storing 32 field descriptions, the co-processor is capable of handling much larger tables. Consecutive blocks of irrelevant fields may be regarded as a single field, providing that the cumulative length of the data corresponding to all of the consecutive blocks is known. The FDSR 71 merely records these consecutive fields as a single field or "gap", and the size counter 73 accommodates the overall length of the gap.

Where the overall length a field or gap is not known, the field or fields will each be explicitly terminated by an end-of-field character. This is normal practice when handling textual data. In this case, the size counter would count down the number of end-of-field characters when a series of consecutive irrelevant fields is being presented on the input bus.

Comparand Identification Unit 80

Figure 6:
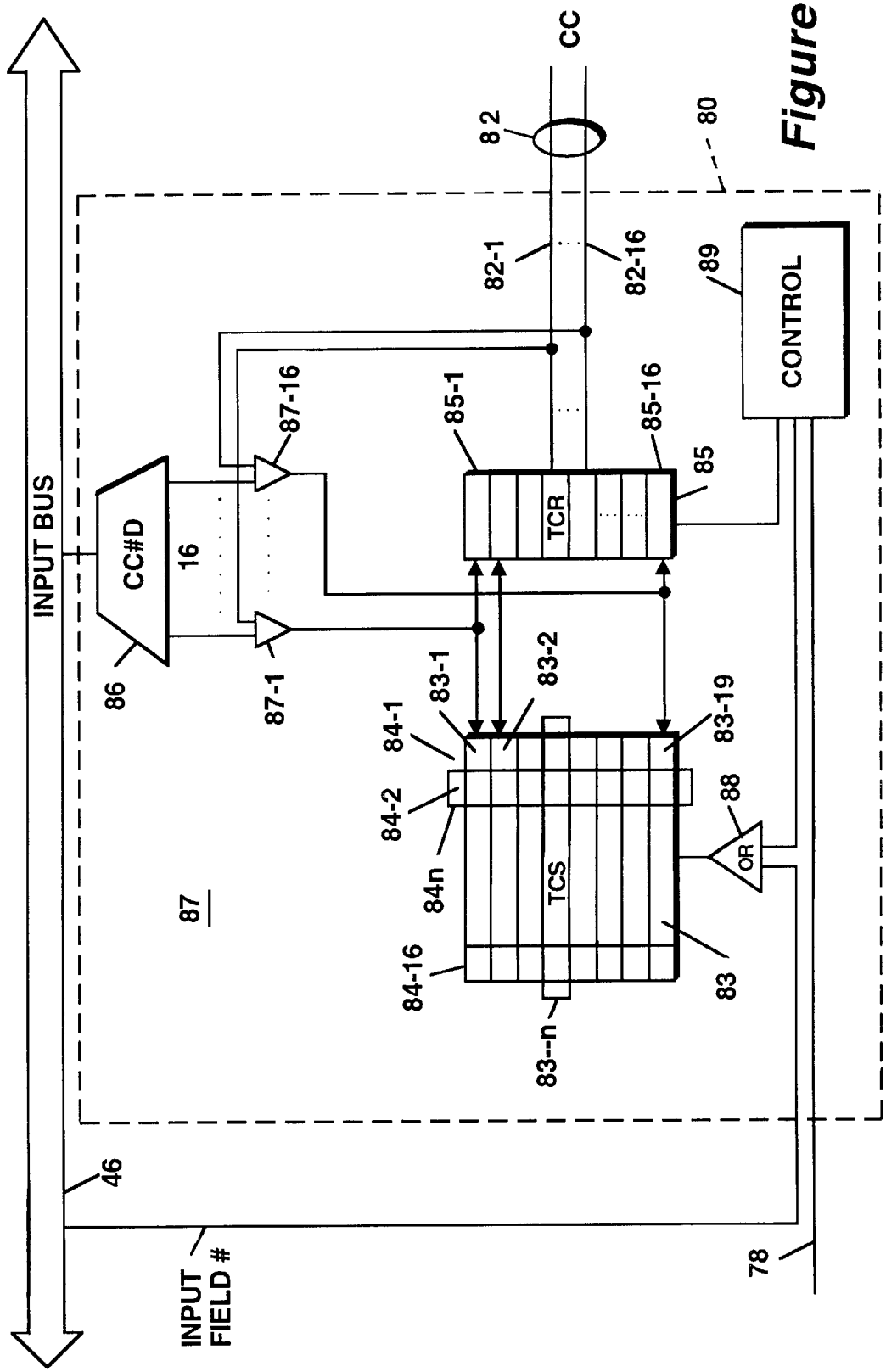
FIG. 6 shows a detailed block diagram of a comparand identification unit of the database engine of FIG. 4.

When retrieving data, comparand identification unit 80 receives the current field identification data from relevant field selector unit 70 over line 78 and triggers a compare cell or set of compare cells which operate on that input field. With reference to FIG. 6, the comparand identification unit 80 includes a trigger codes store 83 which includes trigger code bit positions 83-n (83-1 . . . 83-16) shown horizontally, each corresponding to one compare cell (to be discussed later). The trigger codes store 83 includes positions 84-n (84-1 . . . 84-16) shown vertically for sixteen input candidate fields. Thus sixteen input candidate fields may be accommodated, each of which may be the subject of up to sixteen different compare operations, which will be described in greater detail later. The trigger codes store 83 is addressed vertically.

A trigger codes register 85 includes bit positions 85-1 . . . 85-16 each respectively corresponding to a compare cell. There is thus a sixteen bit trigger code for each input candidate field. These trigger codes are stored in trigger codes store 83 in positions 84-1 . . . 84-16 for each input candidate field respectively. When an input data field appears on input bus 46, if the field is identified as an input candidate field for which a comparison operation is required, the trigger codes corresponding to that input candidate field are copied from the trigger codes store 83 into trigger codes register 85, and are thereby asserted on trigger lines 82. Any bit position 85-n corresponding to a logic high (asserted) will trigger the appropriate compare cell. In the example of table 1, trigger codes will be generated each time the relevant field selector identifies the current field on the input bus 46 as "stock code", and these trigger codes will direct compare cells to perform comparison operations to determine whether the data value for "stock code" lies within the range 4000 to 4999. At all other times, when no input candidate field is present on input bus 46, trigger lines 82 are at logic low (de-asserted).

It is possible, prior to operations, to load the trigger codes store 83 with all of the trigger codes via the input bus 46, as part of the activator program. Alternatively, to shorten the activator, trigger codes may be assembled in place. This method is adopted herein, and employs a compare cell decoder 86 and a set of sixteen OR gates 87-1 . . 87-16.

Then, as far as comparand identification unit 80 is concerned, the activator contains INPUT FIELD#/ COMPARE CELL# tuplets sent via the input bus 46. INPUT FIELD# (four bits in length) is used to address trigger codes store 83 and read into trigger codes register 85 the current value of the corresponding trigger code. COMPARE CELL# (four bits in length) is decoded by compare cell decoder 86 and superimposed with the contents of trigger codes register 85 by OR gates 87-1 . . . 87-16. The result is then stored back to trigger codes store 83 as addressed by INPUT FIELD#.

The address of trigger codes store 83 is thus an OR function of the INPUT FIELD# when loading the activator, and a control block 89 output when retrieving the data. This function is provided by OR gate 88.

Compare Cell Unit 90

Compare cell unit 90 comprises a number of individual compare cells 92-1 . . . 92-16, each dedicated to a particular comparison operation on a particular field.

In the example of table 1, when field "stock code" is identified as currently present on input bus 46 by relevant field selector 70, two cells 92-1, 92-2 in compare cell unit 90 are triggered by comparand identification unit 80. The first of these cells compares the current value on the input bus 46 with a pre-stored comparand value of 4000 to establish whether the current data value is greater than or equal to this comparand value. The second of these cells compares the current value on the input bus 46 with a pre-stored comparand value of 4999 to establish whether the current data value is less than or equal to this comparand value. These results are then ANDed via logic processing unit 100, as will be described.

Figure 7:
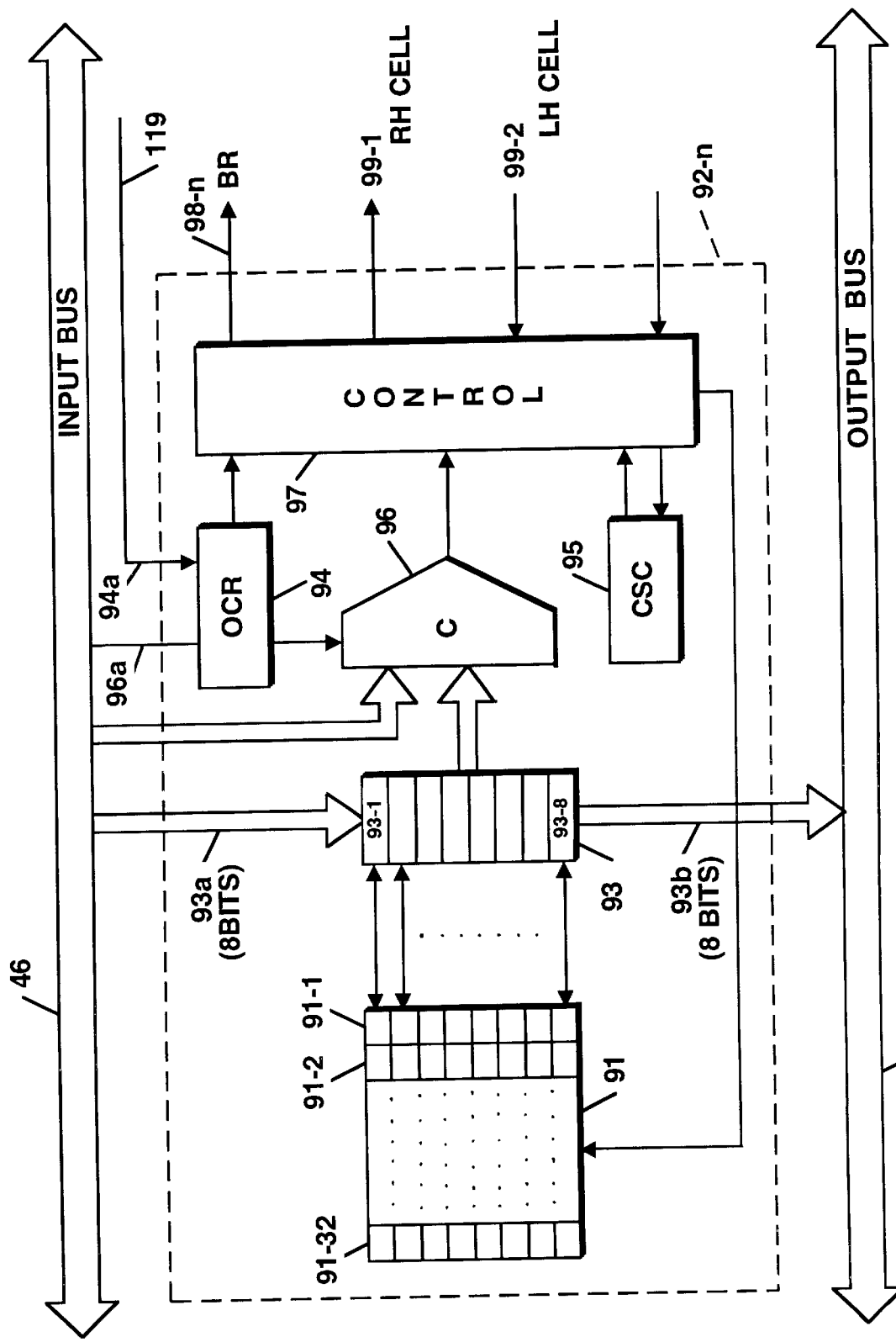
FIG. 7 shows a detailed block diagram of a compare cell of the database engine of FIG. 4.

With reference to FIG. 7, there is shown a single compare cell 92-n of which there are sixteen in compare cell unit 90 of the present embodiment, each one corresponding to one of the trigger lines 82-n. Each cell comprises a comparand buffer 91 having input bus 46 width (eg. 1 byte), which can store a 32-byte comparand value. Each byte is held sequentially in successive columns 91-1 . . . 91-32 and is stored therein prior to processing the data-stream from the input bus 46. An operation code (eg. =, <, >, < >etc) is held in an op-code register (OCR) 94, together with modification bits to determine the mode of operation of the compare cell and its configuration, all of which are also provided prior to processing the data-stream. A comparand size counter (CSC) 95 is provided to determine the end of each data-field in similar fashion to that of the relevant field selection unit 70. A comparator 96 performs the comparison operation between the stored comparand in comparand buffer 91 and the data appearing on the input bus 46. This is done on a byte-by-byte basis by loading the bytes for comparison successively into comparand display register 93, and comparing them with the successive bytes appearing on the bus 46. Control block 97 oversees the operation of compare cell 92-n and produces, on line 98, a Boolean result from the comparison operation. Where the data-field being compared includes comparison of several bytes, the Boolean result will not appear until the end of the data-field appearing on input bus 46.

It will be apparent that in the example of table 1, the same data field ("stock code") is compared by two compare cells 92-n, and each produces a Boolean result, both of which must be ANDed together to establish a qualifying data "hit".

Where comparisons are required on a number of different input candidate fields in the row, separate compare cells 92-n are allocated, and relevant field selection unit 70 triggers each at different times in each data cycle. For example, if additional criteria were placed on the example query that only stock items having unit price less than 1.00 were of interest, a further compare cell would be used to make this comparison when data corresponding to the field "unit price" appeared upon input bus 46.

The compare cells may also operate in chains. For example, in dealing with complex or long character strings greater than 32 bytes in length, the pattern for matching would spread over several compare cells 92-n and is handled sequentially by a chain of cells as separate portions of the data field appear on the input bus 46.

In the preferred embodiment, a further feature of the compare cells is the ability to search for a string value or pattern within a textual character string. For example, an input candidate field of text requires searching for the occurrence of the name "SMITH". In this case, a compare cell is allocated to each letter of the name, in sequence, 92-1 . . . 92-5 respectively. Each compare cell tests every character appearing on the input bus 46 for a match with its allocated character. In order to indicate a overall pattern "hit", compare cell 92-1 detects a hit when "S" appears on the input bus 46. This hit is communicated via output line 99-1 to compare cell 92-2 which receives it on input line 99-2). This enables a test for "M" appearing on the input bus 46 during the next cycle. A hit is thus communicated to the next cell 92-3, which enables a test for character "I" on the following data cycle. In order to fully match, all compare cells in the chain must: 1) register a hit, and 2) have input line 99-2 asserted by the preceding cell. At any point the chain may break down where characters do not appear in the required order. Wild card characters or strings may be accommodated by inclusion of compare cells into the chain which permanently assert a hit on line 99-1, thereby introducing the appropriate character separation between the other cells.

The compare cells may also be operated in a parallel chain in order to analyze data into subsets, such as that required for histogram formation. A numeric range for the histogram, eg. 0 . . . 100 is divided into ten "bins" each of range 10 units. Each successive compare cell 92-1 . . . 92-n is provided with a comparand value of 10, 20, 30 etc. respectively, and establishes whether the input value is less than the comparand. Each of the cells is connected to the higher and lower order cells using lines 99-1 and 99-2 in similar fashion to that described above. For an input value of 25, compare cells 92-1 and 92-2 will each produce a Boolean result of logic zero. Compare cell 92-3, assigned to the relational primitive A<30 will yield a Boolean result of logic 1. It will also assert a signal on line 99-1 to the successive cell 92-4 in the chain, which indicates to that cell that a Boolean result of logic zero should be produced, despite the fact that the compare operation on relational primitive A<40 for that cell would otherwise yield a positive result. Thus an input value is assigned to only one histogram bin by the compare cells, and the number of "hits" in the input data-stream for each cell is counted by the output buffer as will be described hereinafter. Clearly, an additional chain-end cell 92-11 could be assigned the relational primitive A>100 to collect the number of out-of-range results.

The compare cells may also be operated to establish a column maximum or minimum value of a large number of input candidates. In this case, two compare cells are used in conjunction with one another as a pair. Initially, one cell loads into comparand buffer 91 a value "opposite" to the operation to be carried out (ie. zero when establishing a maximum value, and "infinity" when establishing a minimum value). A maximum operation is now described. The cells proceed to work in one of two modes: loading mode, or comparing mode. The mode of operation is determined by the contents of the op-code register 94, as indicated above. The first cell 92-1 loads the first value of the required field input data present on input bus 46 into the comparand buffer 91; the second cell 92-2 compares the value on the input bus 46 with the value currently stored in its comparand buffer (which is zero on the first occasion). The result is thus established that the value on the bus is greater than that stored in the comparand buffer of cell 92-2, which thereby determines that the value loaded into cell 92-1 is presently the highest value received. This being so, the modes of the two cells are reversed, and upon receiving the second field data value, it will be loaded into cell 92-2, and cell 92-1 will compare it with the buffer contents. Two distinct outcomes are now possible:

(a) If the new value is larger than that contained in the buffer 91 of cell 92-1, then cell 92-2 will now be recognized to contain the highest value, and the cell modes will be reversed once again.

(b) If the new value is smaller than that contained in the buffer 91 of the cell 92-1, then cell 92-1 will now be recognized to contain the highest value, and the compare cells will retain their current modes.

The Boolean result of the comparing cell is fed into the subsequent stages of the database engine 44 in order that the output selection unit 110 (to be described) may trigger the mode reversal of the compare cells 92-1, 92-2 using control line 119 (FIG. 4) which feeds back to op-code register 94. The final result is taken from the cells as will be described.

Logic Processing Unit 100

Logic processing unit 100 holds and evaluates multi-place logic primitives, whose inputs are the Boolean results from the compare cells 92-n and the results of preceding logic primitives, thus producing a complete qualification code of the query. Hence, the maximum number of the inputs to a given logic primitive is the sum of relational and logic primitives (minus one). The format of such a primitive is:

an op-code (2 bits), to identify one of OR, NOR, AND, or NAND functions;

an input selection code (30 bits). This is a mask with a bit per input. For regularity, it is assumed to have maximum size, all relevant input bits being '1', the rest '0'.

Figure 8A:
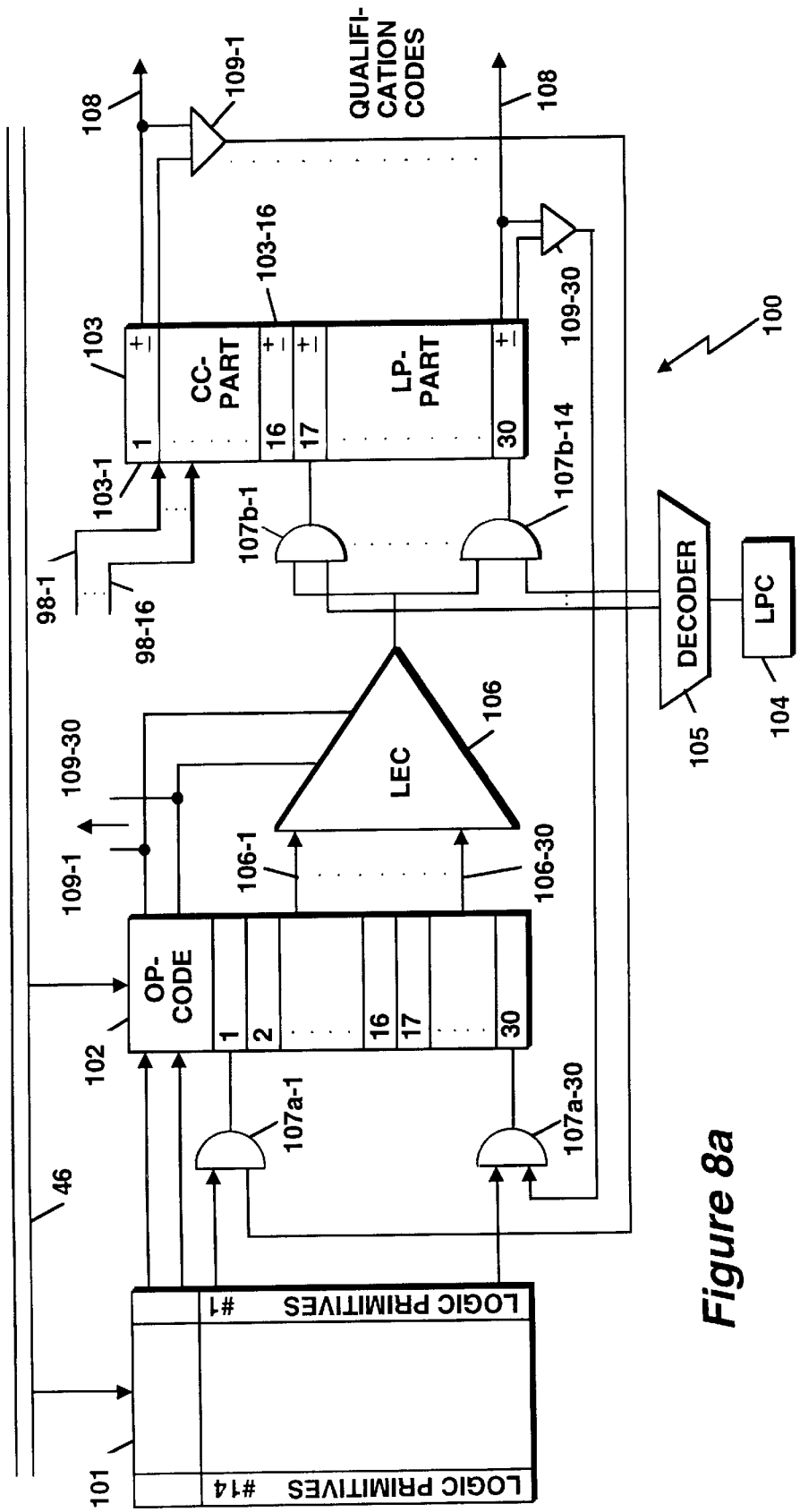
FIG. 8a shows a detailed block diagram of a logic processing unit of the database engine of FIG. 4.

With reference to FIG. 8a, logic processing unit 100 comprises:

a small logic primitives store 101 to hold logic primitives in dataflow order, ie. without forward referencing;

a logic primitives register 102 used as a logic primitives store data register, also connected by inputs to input bus 46;

a qualification code register 103 having direct and inverted outputs, to hold qualification codes. This is in two parts: a compare cell part 103-1 . . . 103-16 to hold Boolean results from compare cells 92-n, and a logic primitives part 103-17 . . . 103-30 to hold the results of logic primitives;

a logic primitives counter 104 of four bits to control the number of logic primitives, used also as an address register for logic primitives register 102, and a pointer to the qualification code register 103 via a decoder 105;

logic evaluation circuits (LEC) 106: one tree of OR gates with direct and inverted output. The tree is connected by inputs 106-1 . . . 106-30 to the positive outputs of logic primitives register 102. The single bit output of logic evaluation circuits 106 is directed into the current logic primitives position of the qualification codes register 103;

a set of 30 AND gates 107a-1 . . . 107a-30 for masking at logic primitives register 102 inputs;

a set of 14 AND gates 107b-1 . . . 107b-14 to guide logic primitive results into current logic primitives position in the qualification codes register 103;

multiplexers 109-1 . . . 109-30 of direct or inverted qualification codes register outputs, depending upon operation. For an OR/NOR operation, direct qualification codes register outputs are passed to logic primitives register 102, and for AND/NAND operations, inverted qualification codes register outputs are passed to logic primitives register 102.

Figure 8B:
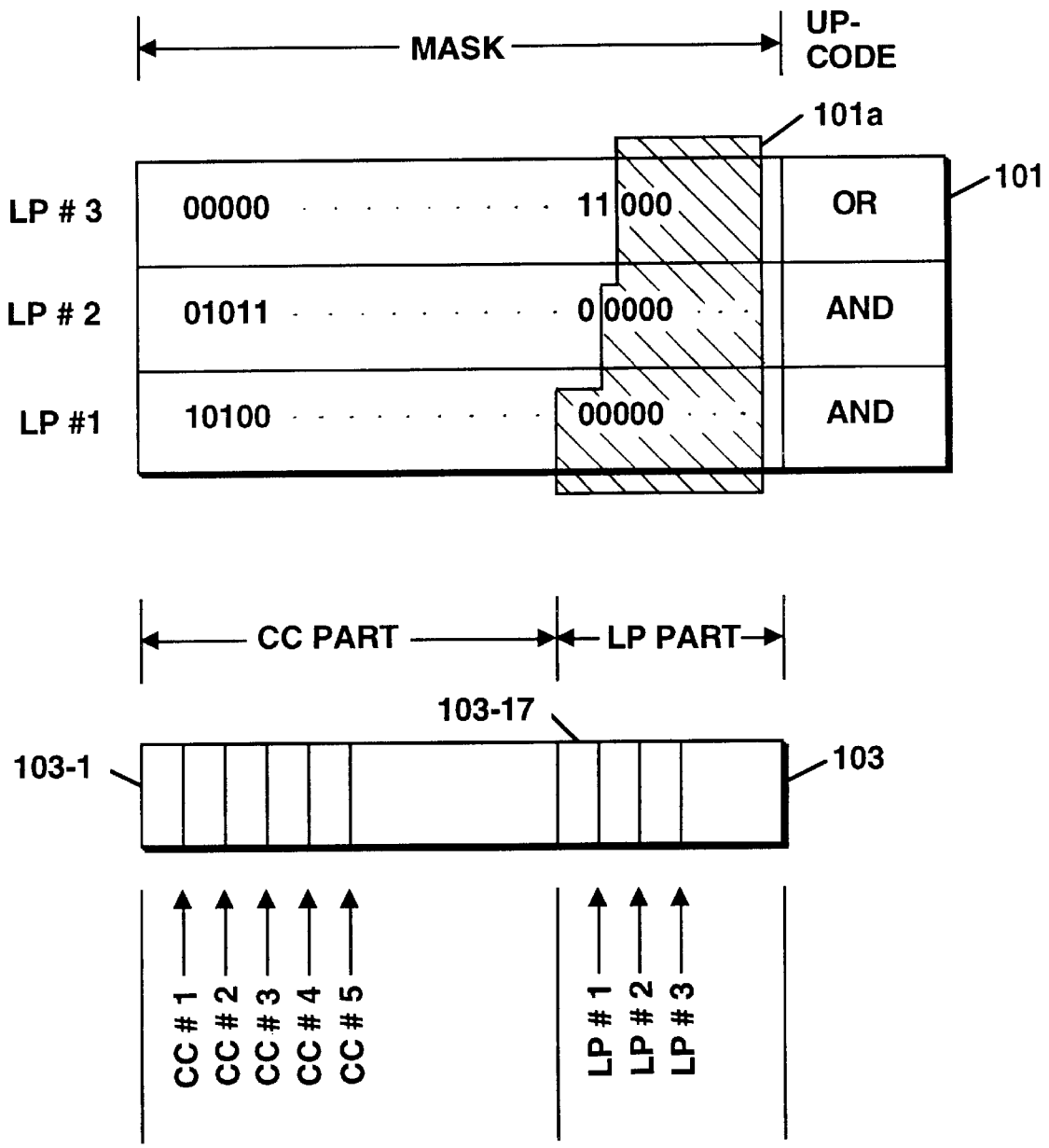
FIG. 8b shows a schematic diagram useful in the description thereof.

In an example, the Boolean expression (<CC#1> AND <CC#3>) OR (<CC#2> AND <CC#4> AND <CC#5>) is being evaluated, where <cc#i> represents the Boolean result of relational primitive #i in compare cell 92-#i. An example of the contents of the logic primitives store 101 and qualification codes register 103 are shown schematically in FIG. 8b. The compare cell part is completed in arbitrary order, and the logic primitives part is completed in ascending order of logic primitive number. The logic primitive bits identified as 101-a (FIG. 8b) are necessarily logic zero.

Output Selection Unit 110

Output selection unit 110 receives the qualification codes for each output candidate field from qualification codes register 102-1 . . . 102-16 on line 108, and generates an output selection bit mask identifying qualified output candidate fields. Output selection unit 110 selects, for each row, the subset of output-candidates in the output buffer 120 that satisfy the qualifiers of the current query. To this end, the output selection unit 110 holds and manipulates output selection codes. Each of these is a bit mask identifying a subset of outputs that are enabled by an individual qualifier. The total number of bits in each output selection code equals the maximum number of outputs: each '1' stands for "selected candidate", in outputs' order in the output buffer 120.

Output selection codes (OSC) are related to qualifiers via a qualification mask code. Each bit of this corresponds to a bit in the qualification codes, and a logic '1' means that the qualification code bit enables an output selection code in order of output selection code appearance. Unqualified queries do not need qualification mask codes, and result in only one output selection code, unconditionally applied. A qualification mask code may contain 1 to 4 logic '1' bits spread arbitrarily. The other bits are zeros.

Figure 9:
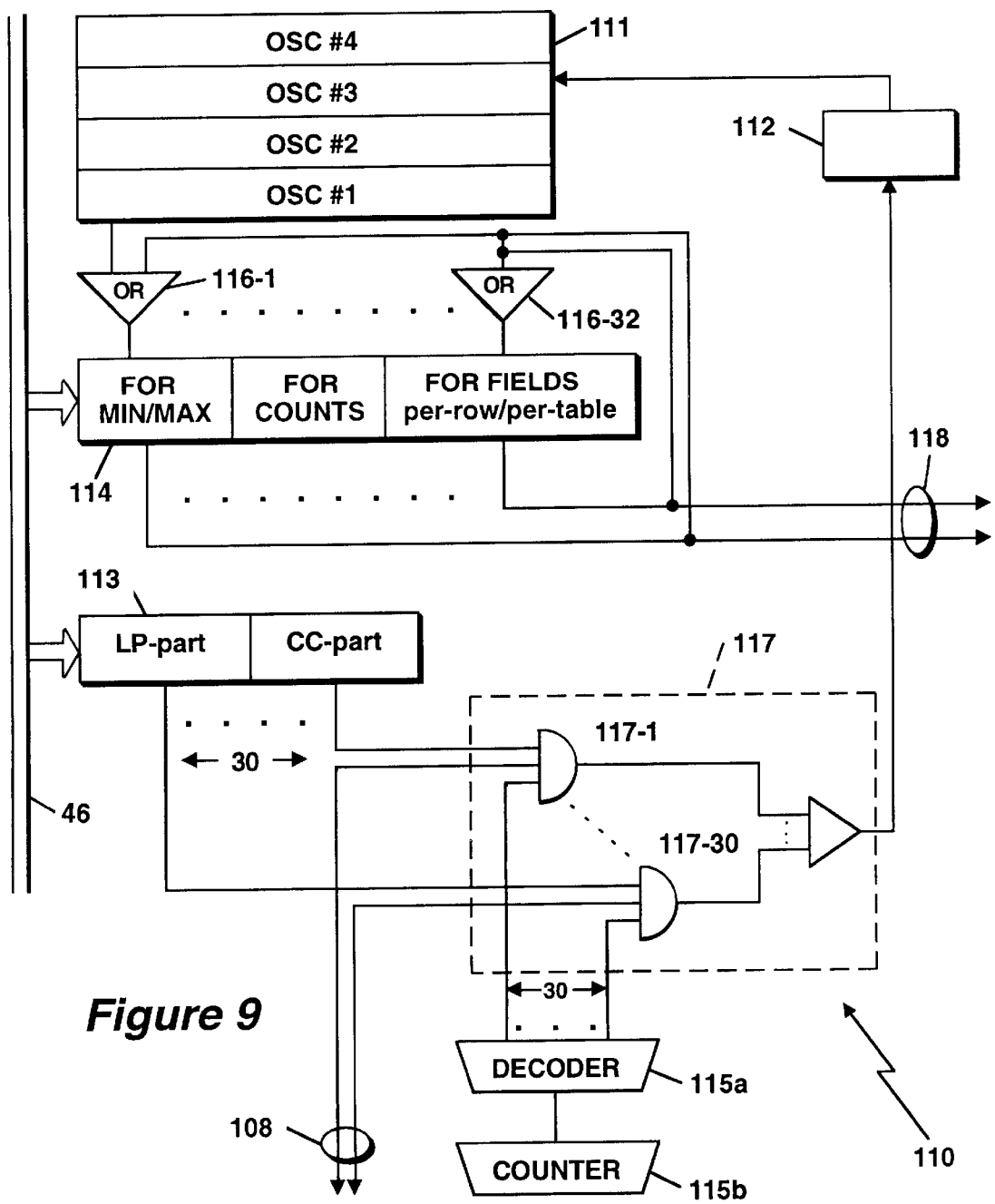
FIG. 9 shows a detailed block diagram of an output selection unit of the database engine of FIG. 4.

With reference to FIG. 9, output selection unit comprises:

a small output selection codes store 111 (4×32 bits), to hold up to four output selection codes;

an output selection codes counter 112 (2 bits), to control the number of output selection codes, used as an address register to the store 111;

a qualification mask code register 113 (30 bits) for holding qualification mask codes, connected to input buffer 46, and whose outputs enable the outputs 108 of qualification code register (103; FIG. 8a) on a one-to-one basis;

a selection code register 114 (32 bits), where selection codes are produced. This is used as a data register to the store 111, and is also connected to the input buffer 46 to load the store 111. In a preferred embodiment, a portion is used for minimum/maximum outputs, a portion for counts and a portion for fields on a per-row/per-table basis;

a qualification mask codes indicator counter 115b and decoder 115a, whose outputs indicate individual qualification mask codes and qualification code register bits in ascending order;

a set of OR gates 116-1 . . . 116-32 at the inputs to selection code register 114, to superimpose selection code register 114 contents with the next output selection code from the store 111. At the end, selection code register 114 would hold a mask of all qualified outputs, to be output only once (since more than one output selection code may mask the same output);

a set 117 of AND gates 117-1 . . . 117-30, ORed together for the outputs of qualification mask code register 113 and the outputs of qualification code register 103, enabled by the decoder 115a outputs of the qualification code mask indicator counter 115b. This counter 115b is stepped up from 1 to 30, and if the corresponding positions of the qualification mask and qualification mask code register 113 are logic '1', then the next output selection code from the store 111 is superimposed into the selection code register 114 (initially all bits at zero), and the counter 115b incremented.

The selection code enables the output of:

field pointers/values from the output buffer 120. There is a one-to-one correspondence between selection code bits and output buffer locations. The latter are output if the corresponding selection code bit is '1'. This happens one-by-one, in ascending order, eg. by encoding each '1' into an output buffer address (on both a per-row and a per-table basis);

counts from output buffer 120, are processed as above, but only updated per row and output per table;

for maximum and minimum functions, there is a one-to-one correspondence between the selection code bits and, in the preferred embodiment, the first eight compare cells 92-1 . . . 92-8. These are updated on a per-row basis and output on a per-table basis.

The output selection unit is also provided with a feedback control line 119 with which to change the mode of operation of the compare cells as described hereinbefore.

Output Buffer 120

Figure 10:
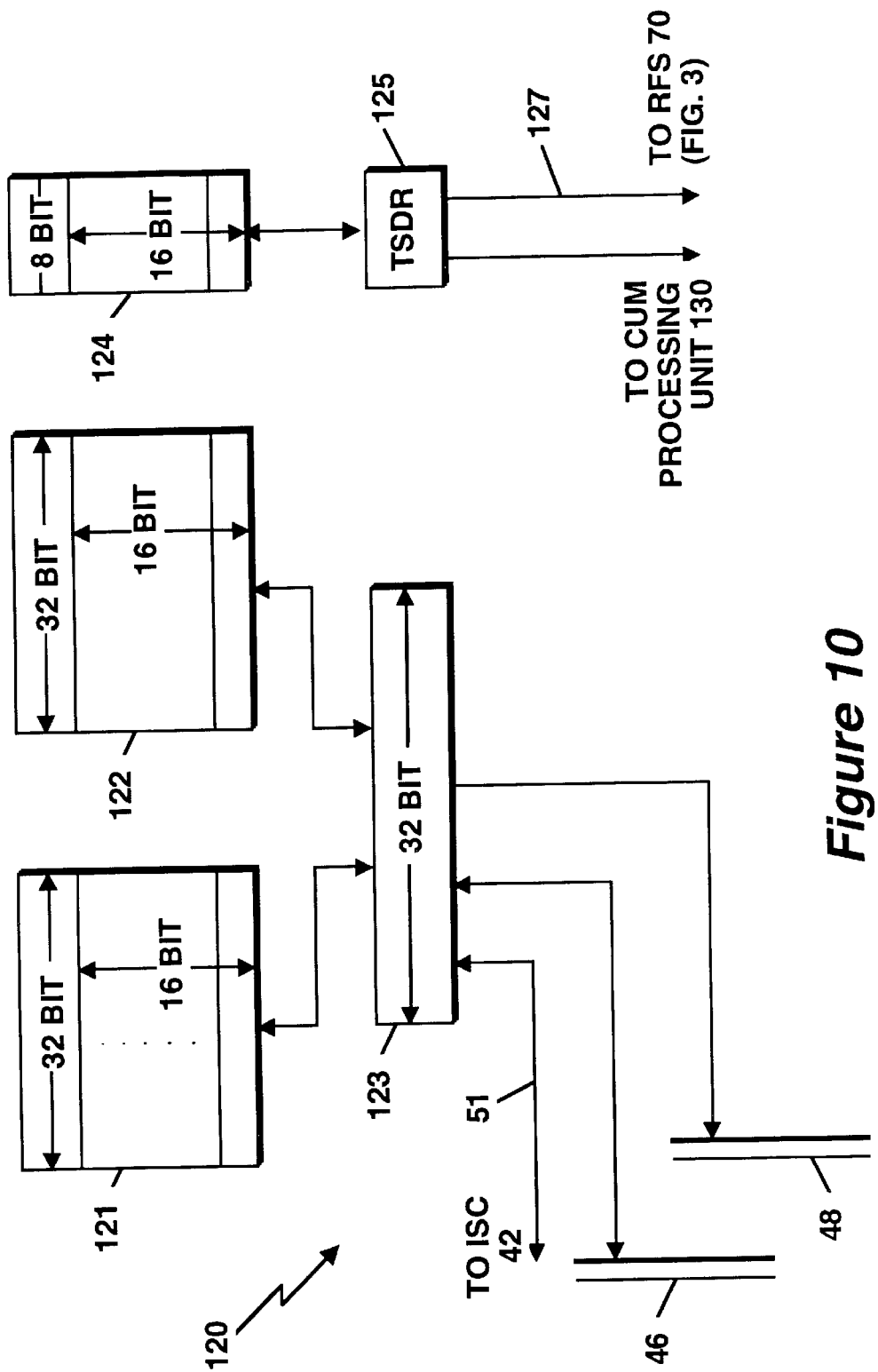
FIG. 10 shows a schematic block diagram of an output buffer unit of the database engine of FIG. 4.

Output buffer 120 is small, eg. 128 bytes, for in the presently preferred embodiment, it buffers/outputs pointers to (rather than values of) output candidate fields. It can also buffer short numeric values (eg. up to 8 bytes) that need cumulative processing, eg. summation. With reference to FIG. 10, the output buffer comprises:

two identical buffer stores 121, 122, each capable of buffering up to, for example, sixteen items, one per output buffer location, as they appear on the input bus 46. Of course, the output candidate fields could comprise the whole table row, and in this case it would be desirable to buffer and output only the row address. Per-row pointers are stored in one store, say store 121. Numeric values are buffered in one or both banks, depending upon size. Per-table pointers (predicated by minimum and maximum functions) are stored in output buffer store 121 or 122 in unpredictable alternation, new arrivals overwriting the running non-best;

an output buffer data register 123 connected to the input bus 46 and to the output bus 48, and serving both buffer store 121 and buffer store 122 in turn;

a tag store 124, with as many locations as each buffer store 121, 122, only narrower (eg. 1 byte). Tag store 124 initially stores type and size of output candidates from the relevant field selection unit 70;

a tag store data register 125 comprising an output field size counter. Register 125 controls data output from buffer store 121 and 122. Descriptors having fixed length, tag store 124 is only needed when dealing with numeric values;

output buffer address register 126 (not shown), addressing both buffer store 121 and 122, and tag store 124 concurrently. During input, output buffer address register 126 functions as an up-counter, addressing buffer stores 121, 122 and tag store 124 in ascending order. During output, it encodes the individual logic '1's of the selection codes.

There is also a separate small buffer, not shown, for holding counts, qualified or unconditional, eg. the total number of rows. These counts are accessed via mask bits in the selection codes. This buffer is included in the output buffer 120 for ease of description. It could be separate, and also made to hold logic primitives and output selection codes, thus simplifying logic processing unit 100 and output selection unit 110. Then, in a practical embodiment of database engine 44, such a buffer would be of the order of 100 bytes.

Output buffer 120 provides a location per output candidate (up to sixteen). During retrieval these are filled in ascending order. When relevant field selection unit 70 comes across output candidates, their addresses (or numeric values in the case of summation) are stored and descriptors copied from relevant field selection unit 70 into the tag store in one-to-one locations with output buffers 121, 122.

Upon qualification, the selection code is encoded in a series of output buffer addresses to output to the interface and stream control unit 42 (and the host 30). Values are sent to the cumulative processing unit 130 for summation. In the latter case, tag store values are also sent to instruct the cumulative processing unit 130. Tag store values can also be used in the former case, to instruct the host about kind/type of field pointed to, to complement a field descriptor.

Thus, where output candidate fields qualify, the output selection bit mask provided from output selection unit 110 on line 118 causes the corresponding candidate field address pointer to be read from the appropriate buffer store 121, 122, converted to a descriptor, and placed on the output bus 48. The descriptor is a pointer complemented with a field or row designation. Thus the output data stream asserted on output bus 48 comprises a stream of address pointers to locations in memory of rows or fields which have qualified. This output stream is passed to the interface and stream control unit 42 for routing to the appropriate destination such as memory 31.

Where a maximum or minimum function is being applied on a "per-table" basis as described with reference to the compare cell unit 90, each successive row is stored in either buffer store 121 or 122. The store used will depend upon the result of the previous comparison by compare cell unit 90-n, which will ensure that the smaller (or larger) value is overwritten by the new output candidate field, the mode switching function being provided by output selection unit 110 in similar fashion to that previously described with reference to the compare cells.

The output buffer also includes count stores (not shown) for maintaining a qualified row count on a "per-table" basis. These may apply, in particular to the histogram bin counting function already described in connection with the compare cells.

Where a column-wise summation of numeric qualifying fields is required, the numeric value of the field will be stored in the buffer pending qualification, and the numeric value may then be passed to a cumulative processing unit 130, either via output bus 48, or by separate lines.

Cumulative Processing Unit 130

Output of per-table data is facilitated by a cumulative processing unit 130. Where an output field is required for cumulative processing (as identified by the relevant field selection unit 70), the output selection unit 110 communicates such to the cumulative processing unit 130 which reads the appropriate data output from output buffer 120 or from the output bus 48. In the example of table 1, the summation of the total value of stock which qualifies according to the query would be totalled by the cumulative processing unit 130.

Global Control Unit 140

Global control unit 140 is provided to oversee all of the units in the database engine. It comprises logic to perform operations as elaborated hereinafter. Upon completion of the input table, global control unit 140 reports all exception conditions which may have occurred during the execution of an activator, eg. abnormal table end, and provides output data status information, for example number of rows processed, and any per-table data, eg. row counts.

Operation

The operation of the exemplary relational database co-processor (RDCP) 40 will now be described in detail. At any given time, the RDCP 40 may be dormant or active. For each transaction (ie. each "packet" of work passed from the host processor) the RDCP enters an active state, passing through three modes of operation—activation, execution, and termination.

Activation Mode

Figure 11:
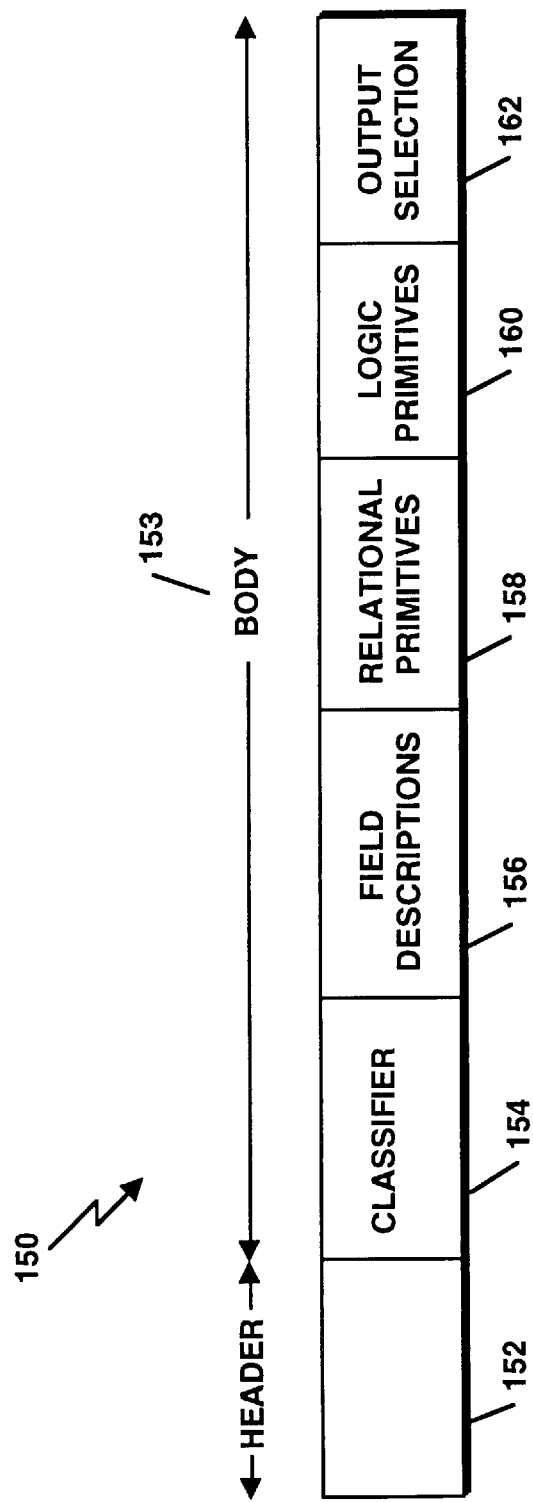
FIG. 11 shows a schematic diagram of the components of an activator program used in the present invention.

With reference to FIG. 11, there is shown an exemplary format of an activator program 150:

- a header portion 152 contains addresses of the next activator and input/output areas, and is loaded into the interface and stream control unit 42 (FIG. 3);
- a classifier portion 154 defines the nature of the transaction and the lengths of the four parts of the activator which follow. This is loaded into the database engine control unit 140.
- a field descriptions portion 156 lists the type/size specifications for relevant fields and gaps, and is loaded into the relevant field selection unit 70, as per-row layout;
- a relational primitives portion 158 lists the compare-type instructions, used to load the comparand identification unit 80 and compare cells 90;
- a logic primitives portion 160 lists the logic connectives with their input selection masks, and is loaded into logic processing unit 100; and
- a output selection portion 162 includes the qualification mask code plus between one and four output selection codes to be loaded into the corresponding register and store in the output selection unit 110.

In operation, a dormant RDCP 40 is awakened by a prompt from the host processor 30, which loads a memory-block address into the activator address register 52. This points to the activator program 150, which is composed, as described, of two main sections: a header 152, for transaction control by interface and stream control unit 42, and a body 153 containing the query functions to operate on the data stream which is routed by the ISC 42 to the database engine 44.

The header 152 contains:

a) the addresses of input and output memory blocks or pointers thereto, which are loaded into the data-in register 54 and data-out register 56;

b) the starting address of the next activator program, if any;

c) a status-communication area, through which the host 30 and RDCP 40 signal each other of the progress, success and the follow-on of the transaction, or of the needs for data and memory.

These areas are accessible to the RDCP 40 throughout the transactions by using the block address part of the activator address register 52 and corresponding offsets (assuming that a practical activator would fit into one memory block).

ISC 42 reads the header, returns "in progress" status to the host 30, and then loads the activator's body 153 into the database engine 44. The body comprises a classifier 154 and four parts 156–162, each of which is a collection of specialised primitive functions. The classifier specifies the nature of expected results, and the primitive functions' counts of the parts. This is used by global control unit 140 to accommodate the primitive functions in the database engine, and to control the output.

The first part 156 of the activator body contains the field descriptions identifying the nature and size of the data in each data field, which go to the relevant field descriptions storage register 71 as previously described. These are derived directly from, and follow the order of attribute definitions for the requested table. Output field descriptions are also copied from which to generate trigger codes.

The second part 158 of the activator body contains the relational primitives, ie. the comparisons extracted from the query. Each contains the operation code (eg. =, <, > etc) which is loaded into an appropriate op-code register 94 in a compare cell 92-n, an input reference to a relevant field section unit store identifying the input candidate field (ie. "field#), and a literal comparand (eg. "4000" in the example of table 1) against which to compare the data-value of the appropriate field of the incoming data-stream. These relational primitives are loaded one-to-one in the compare cells comparand registers 93n in ascending compare cell order.

Input references, together with compare cell addresses, are used by the comparand identification unit 80 to compose the trigger codes which go to an appropriate comparand identification unit 80 store. Each trigger code is a superposition of decoded compare cell addresses of all compare cells that refer to that input.

The third part 160 of the activator body contains the logic primitives, which identify the Boolean functions which must be applied to the Boolean results passed out of compare cell unit 90. These go to an appropriate store in logic processing unit 100.

The fourth part 162 of the activator body comprises a qualification mask code and output selection codes which are sent to the output selection unit store 111 to identify the data fields which are required for real time output, and those required for cumulative output.

Execution Mode

The execution mode consists of two sub-modes which alternate on per-row basis: input sub-mode and output sub-mode.

i) Input sub-mode

During input sub-mode a table row is read from disk 34 or from the host processor's memory 31 (the latter case being exemplified herein), using the data-in register 54 and is then placed on the input bus 46, field-by-field.

Relevant field selection unit 70 identifies the description of each field while it appears on the input buffer 46 as previously described, completing a full cycle of the fields (attributes) for each table row, and informs comparand identification unit 80, output buffer 120 and ISC 42 about the data field's relevance, data-type and duration. Numeric field gaps are skipped by jumping to the next relevant field selection entry: ISC 42 increments data-in register 52 accordingly to effect this. Character string gaps are monitored for the appropriate number of end-of-field characters as previously described. Output buffer 120 unconditionally stores output candidates as field address pointers or numeric values for cumulative processing unit 130. At each new input field, comparand identification unit 80 evokes the relevant field's trigger codes from the trigger codes store 83 by placing them in trigger codes register 85. This indicates to the corresponding compare cell 92-n that a related input is available on input bus 46.

Each compare cell 92-n operates in one of two modes: a) comparing mode, when the compare cell 92-n reads a comparand from comparand buffer 91 into comparand display register 93 and compares it with the data present on the input bus 46; and b) loading mode, when a compare cell 92-n writes into its comparand buffer 91 the data read from the input bus 46. Literal strings longer than the compare cell comparand buffer 91 size are dealt with by compare cell chains. Individual compare cells 92-n having the same op-code are in charge of string parts, and serially trigger each other in manner already described, the last one outputting the final Boolean result on line 98-n. Contained substrings with uncertain position are checked for the same way, but each compare cell 92-n deals with only one character, and can be re-triggered several times during one comparison, also as previously described.

Membership of subsets, such as that of histogram construction, is tested by compare cell chains in parallel also as previously described. Column maximum and minimum values are derived by compare cell 92 pairs where one compare cell operates in loading mode, and the other operates in comparing mode as previously described.

As soon as the relevant field selection unit 70 indicates the end of the last input candidate field of the table row, ie. the one matching the last trigger code in the comparand identification unit 80, the Boolean results produced by the compare cells 92-n are passed on to the qualification code register 102 in logic processing unit 100 which enables them to be read by output selection unit 110 on line 108.

(ii) Output sub-mode

When the relevant field selection unit 70 indicates an end-of-row, database engine 44 switches to output sub-mode. Output selection unit 110 is then activated, and operates in two phases. During the first phase it iteratively produces the final selection code in the selection code register 114. For each result in the qualification code register 103, transmitted to output selection unit 110 on line 108, the matching bit position is updated.

During the second phase, the output selection unit 110 selects or updates outputs thus:

a) Per-row output. Each selection bit 114-n is encoded into the respective output buffer 120 address, to read the corresponding pointer from output buffer store 121, convert it into a descriptor and send it via output bus 48 to ISC 42 and thereby to the host memory 31. A descriptor is an address pointer complemented with a field or row designation: relative number (within the set of output candidate fields); one bit to distinguish adjacent qualified rows;

b) Update of per-table output. Each selection code register bit 114-n is either encoded into an address for a corresponding output buffer counts store to read, increment and save the appropriate count or activates feedback line 119 to a compare cell pair deriving maximum or minimum values as previously described to change the modes thereof.

There are two more per-table-output cases, dynamically catered for.

Firstly, fields which are selected by the minimum or maximum conditions established by the compare cell pairs are buffered in the output buffer 120, since per-row output is disallowed as the mode alternation of output buffer stores 121, 122 is unpredictable. They follow the modes of the corresponding compare cell pair, and are controlled by the same feedback line.

Secondly, column-wise sums of numeric fields are dealt with similarly to field-pointers. They are buffered in output buffer stores 121, 122 during input sub-mode. During output sub-mode, when qualified, they are sent via output bus 48 to the cumulative processing unit 130 rather than ISC 42 to be summed under control of the output selection unit 110 and global control unit 140.

After that database engine 44 switches back to input sub-mode, to scan the next table row.

Termination Mode

When ISC 42 informs the database engine 44 that the last row has been read, global control unit 140 performs a termination procedure. This consists of sending whole-table results to the host memory 31 addresses defined in the data-out register 58, via output bus 48. The results include:

i) a condition code, reflecting unusual conditions during query execution as previously described. This also includes the total number of rows processed, as well as "completed" status, and is sent to the host/co-processor communication area as identified by the address stored in the data-out register 58;

ii) per-table results, as requested in the activator. These are sent one-by-one from the corresponding buffers in output buffer 120. Counts are read from the count store: their number is defined by the appropriate counter in the global control unit 140. Sums are sent from a running totals store in the cumulative processing unit 130 under the control of its own counter.

Fields qualified by maximum or minimum functions are dealt with just like per-row results, only output at the table end from the output buffer store 121 or 122 which contains them, the output buffer stores 121, 122 mimicking the behaviour of the compare cell pairs that derive the minimum and maximum values. The final result of the minimum/ maximum operation remains in the compare cells 92-n. In a preferred embodiment, the first eight cells 92-1 . . . 92-8 can be allocated to the min/max function, and thus four min/max functions are possible. These are daisy chained and within each pair, the cell which holds the desired result is defined by its modification bits. A serial signal is passed from cells 92-1 . . . 92-8 and the cell that contains a result passes it to the output bus 48. The other cell just lets the signal through. When the signal appears after the eighth cell 92-8, the min/max output is completed.

ISC 42 may then check to determine whether a further activator has been provided by the host. If this is so, it will be found in the activator address register 52: this may be loaded, and a new transaction commences. Otherwise the co-processor lapses into a dormant state.

Although the embodiments of the present invention described herein have been focused toward implementations including, for example, specific buffer sizes, number of compare cells and complexity of logic processing capability, it will be recognized that the overall capability of the co-processor is determined by these factors, and may be expanded accordingly. However, of importance is the production of a compromise solution of complexity versus cost, and in particular, the illustrative embodiments are well suited to integration onto a single application specific integrated circuit (ASIC). In such a design, pin-out is a critical factor in the allowable complexity of the system, and the embodiments described herein have been directed toward a circuit having a pin-out of approximately 150, and using approximately 50,000 gates on the ASIC.

Other variations for the structure of the database processor of the invention are conceivable and are deemed to be covered under the scope of the present invention which is as defined in the appended claims.

What is claimed is:

1. A database processor (40) for connection to a host processor (30) via first bus means (32), said database processor (40) comprising:

interface means connected to said first bus means for receiving and transmitting data thereover between said database processor (40) and said host processor (30);

a database engine (44) connected to said interface means by internal bus means; said database engine including:

means for storing selection criteria relevant to a database query raised by said host processor (30);

comparison means (90) for comparing input candidate data received on internal bus means in accordance with said selection criteria and producing a result therefrom, wherein said comparison means (90) for comparing input candidate data includes a plurality of compare cells (92) each configured to test a single relational primitive, each compare cell including output generating means (97,98) for indicating an output result of said relational primitive test;

storage means (120) for storing output candidate data received on said internal bus means, said storage means located within said data base engine (44); and means for transmitting (120) on said internal bus means (48) at least a part of said output candidate data in response to said result from said comparison means.

2. A database processor according to claim 1 wherein said first bus means for receiving and transmitting data comprises a two-way bus (32), and wherein said internal bus means comprises a separate input bus (46) and a separate output bus (48), and wherein said interface means comprises an interface unit (42), wherein said interface unit (42) includes means for address storage (54) identifying a sequence of data retrieval locations for processing by said database engine (44), and including field selection means (70) including means (51,140) for incrementing said sequence to prevent retrieval of data which is neither input candidate data nor output candidate data.

3. A database processor according to claim 1 wherein said plurality of compare cells (92) are mutually coupled, said output generating means (97,98) for indicating an output result further includes means (99-1,99-2) for testing the output result of at least one other of said compare cells (92).

4. A database processor according to claim 1 wherein said plurality of compare cells includes at least two cells each including:

a mode flag register (94); and a comparand buffer (91);

said cells including means (93,93a) for copying data present on said input bus to said comparand buffer (91) when said mode flag register (94) is set to a first status and including means (93,96) for comparing configured to compare the data in said comparand display register (91) with the data present on said input bus (46) when said mode flag register (94) is set to a second status, and means for logic processing (100) including:

means for receiving output results (103) coupled to each of said compare cells;

means for logic evaluation (106) coupled to said means for receiving output results and adapted to evaluate said compare cell output results according to said selection criteria.

5. A database processor according to (any preceding) claim 1 and further including means for field selection (70) coupled to said comparison means (90), said field selection means including means for input candidate data identification (72) configured to indicate whether data asserted on said input bus is input candidate data or not input candidate data.

* * * * *